United States Patent
Chen

(10) Patent No.: US 10,530,039 B1
(45) Date of Patent: Jan. 7, 2020

(54) ANTENNA EXTENSION DEVICE

(71) Applicant: Climax Technology Co., Ltd., Taipei (TW)

(72) Inventor: Yi-Kai Chen, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 0 days.

(21) Appl. No.: 16/418,704

(22) Filed: May 21, 2019

(30) Foreign Application Priority Data

May 6, 2019 (TW) .............................. 108115573 A

(51) Int. Cl.
  *H01Q 1/24* (2006.01)
  *H04M 1/02* (2006.01)
  *H04N 7/18* (2006.01)
  *H01Q 21/28* (2006.01)

(52) U.S. Cl.
  CPC ............... *H01Q 1/24* (2013.01); *H01Q 21/28* (2013.01); *H04M 1/0291* (2013.01); *H04N 7/186* (2013.01)

(58) Field of Classification Search
  CPC .............. H01Q 1/24; H01Q 1/28; H04N 7/186
  USPC ........................................................ 455/575.7
  See application file for complete search history.

(56) References Cited

U.S. PATENT DOCUMENTS

| | | | |
|---|---|---|---|
| 6,717,551 B1* | 4/2004 | Desclos | H01Q 1/241 343/700 MS |
| 2014/0091978 A1* | 4/2014 | Yamagajo | H01Q 5/335 343/843 |
| 2016/0301140 A1* | 10/2016 | Du | H01Q 9/0442 |

* cited by examiner

*Primary Examiner* — Congvan Tran
(74) *Attorney, Agent, or Firm* — Donald E. Stout; Stout, Uxa & Buyan, LLP

(57) ABSTRACT

An antenna extension device includes a first part disposed on an inner surface of a panel; a second part disposed in space between an opening of a building and the panel, the opening correspondingly accommodating the panel; and a third part disposed on an outer surface of the panel. Two ends of the second part are connected to the first part and the third part respectively to form a U-shape cross-sectional profile, and the third part is connected to a feed point of a sensing device.

14 Claims, 2 Drawing Sheets

ANTENNA EXTENSION DEVICE

CROSS-REFERENCE TO RELATED APPLICATIONS

This application claims priority to Taiwan Patent Application No. 108115573, filed on May 6, 2019, the entire contents of which are herein expressly incorporated by reference.

BACKGROUND OF THE INVENTION

1. Field of the Invention

The present invention generally relates to a home intelligent network, and more particularly to an antenna extension device adaptable to a home intelligent network.

2. Description of Related Art

Home intelligent network is capable of controlling home facilities, such as lighting, heating, ventilation, air conditioning appliances, communication systems, entertainment and home security devices, to improve convenience, comfort, energy efficiency and security. Home intelligent network may be used to perform disaster warning and prevention by detecting an event (e.g., smoke or overheat caused by a fire).

Home intelligent network not only controls indoor constituent devices but also communicates with outdoor constituent devices, to achieve home security. For example, a video door phone (VDP) or a passive infrared (PIR) camera may be set up outside the door or window for capturing or sensing people outside the door. In another example, a door contact may be set up in a door or window gap for sensing abnormal door motion.

The constituent devices of home intelligent network commonly communicate with one another via radio signals, for example, adopting Wi-Fi based on IEEE 802.11 standard. The radio signal may have an outdoor range of hundreds of meters. However, walls of or obstructions in a building may largely reduce strength of the radio signal. Therefore, the radio signal transmitted from the outdoor constituent device may usually be missed and a chance to promptly react may be lost.

A need has thus arisen to propose a novel scheme to ensure that home intelligent network can properly receive or transmit radio signals.

SUMMARY OF THE INVENTION

In view of the foregoing, it is an object of the embodiment of the present invention to provide an antenna extension device for enhancing radio wave receiving and transmitting indoors and outdoors without being blocked by door or window.

According to one embodiment, an antenna extension device includes a first part, a second part and a third part. The first part is disposed on an inner surface of a panel. The second part is disposed in space between an opening of a building and the panel, the opening correspondingly accommodating the panel. The third part is disposed on an outer surface of the panel. Two ends of the second part are connected to the first part and the third part respectively to form a U-shape cross-sectional profile, and the third part is connected to a feed point of a sensing device.

According to another embodiment, an antenna extension device includes a first part and a second part. The first part is disposed on an inner surface of a panel. The second part is disposed in space between an opening of a building and the panel, the opening correspondingly accommodating the panel. The second part is connected to the first part to form an L-shape cross-sectional profile, and the second part is connected to a feed point of a sensing device.

DETAILED DESCRIPTION OF THE INVENTION

Figure 1:
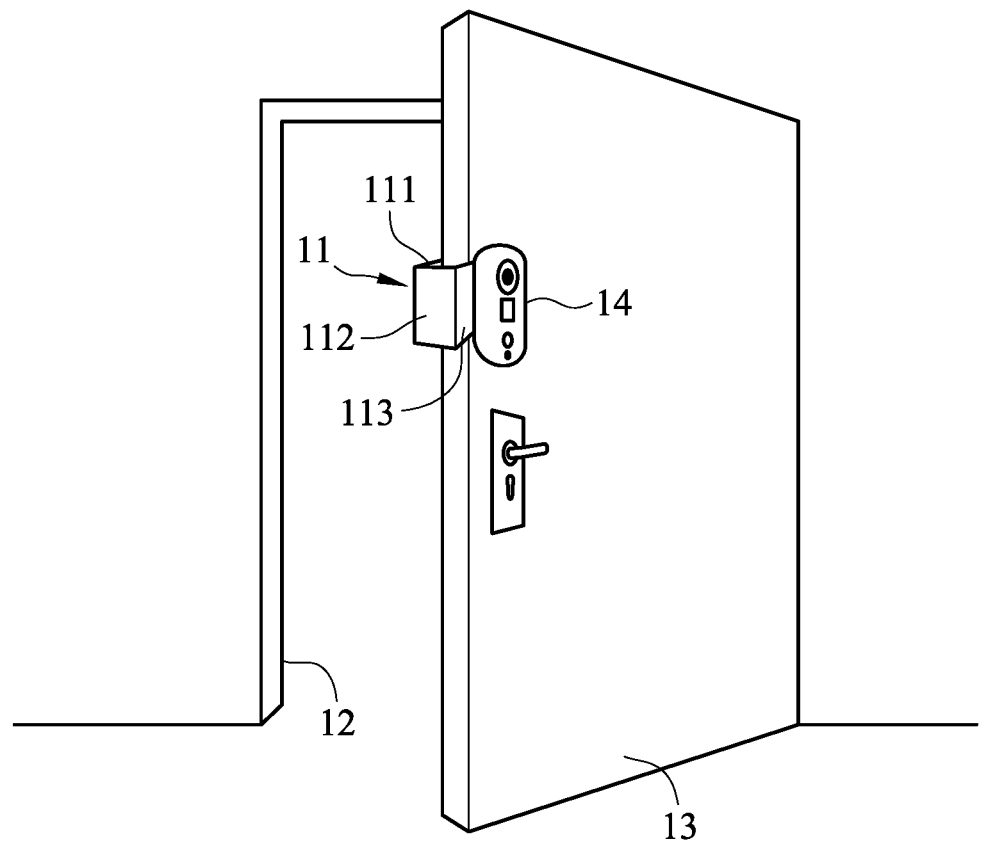
FIG. 1 shows a perspective view illustrating an antenna extension device according to a first embodiment of the present invention.
Figure 2:
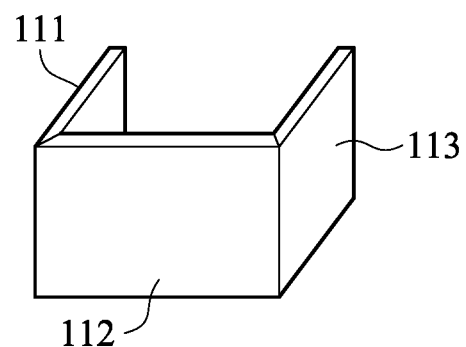
FIG. 2 shows an enlarged perspective view illustrating the antenna extension device of FIG. 1.

FIG. 1 shows a perspective view illustrating an antenna extension device 11 according to a first embodiment of the present invention, and FIG. 2 shows an enlarged perspective view illustrating the antenna extension device 11 of FIG. 1. The antenna extension device 11 of the embodiment may be disposed between an opening 12 (or frame) of a wall of a building and a corresponding panel 13. The antenna extension device 11 is configured to facilitate radio wave transfer between indoors and outdoors without being blocked by the panel 13. The opening 12 may accommodate the panel 13 correspondingly. In one embodiment, the opening 12 and the panel 13 may be a doorway and a door plank respectively, or may be a window opening and a window pane respectively. The doorway 12 and the door plank 13 will be exemplified in the following embodiment. Although one antenna extension device 11 is exemplified, it is appreciated that more than one antenna extension device 11 may be concurrently used instead.

In the embodiment, the antenna extension device 11 having a U-shape cross-sectional profile may include a first part 111, a second part 112 and a third part 113. Two ends of the second part 112 may be connected to the first part 111 and the third part 113 respectively, resulting in the U-shape cross-sectional profile. The first part 111, the second part 112 and the third part 113 may be integrally formed, or may be individually formed and then combined. An angle between the first part 111 and the second part 112 may be a substantially right angle or an angle of degrees other than 90, and an angle between the third part 113 and the second part 112 may be a substantially right angle or an angle of degrees other than 90. The first part 111, the second part 112 and the third part 113 as exemplified in FIG. 1 and FIG. 2 have rectangular flat surfaces, while they may have other shapes or have curved surfaces.

As exemplified in FIG. 1, the first part 111 of the antenna extension device 11 may be disposed on, and be substantially parallel with, an inner surface of the door plank 13; the second part 112 may be disposed in (vacant) space between the doorway 12 (or frame) and the door plank 13; and the third part 113 may be disposed on, and be substantially parallel with, an outer surface of the door plank 13. Specifically, one end (away from the second part 112) of the third part 113 may be directly or indirectly connected to, for example, a feed point of, a sensing device 14 (e.g., camera, video camera or sensor). In one embodiment, the sensing device 14 may include a video door phone (VDP), a passive infrared (PIR) camera or an Internet Protocol (IP) camera, and may be disposed on the outer surface of the door plank 13 for capturing or sensing objects such as people outside the door.

The first part 111, the second part 112 and the third part 113 of the antenna extension device 11 may include a rigid or flexible structure that is either hollow or solid. The first part 111, the second part 112 and the third part 113 may be made of an electrically non-conductive material, for example, plastics or rubber. The antenna extension device 11 may further include one or more conducting wires, disposed in or on the first part 111, the second part 112 and the third part 113, and one end of each conducting wire may be connected to a feed point of the sensing device 14. In one example, the conducting wires constitute a flat cable disposed in the first part 111, the second part 112 and the third part 113. In another example, the first part 111, the second part 112 and the third part 113 constitute a flexible printed circuit board (PCB), on which the conducting wires are disposed.

In one embodiment, the antenna extension device 11 may be fixed to the door plank 13 by conventional technique, for example, by using screws or glue. In another embodiment, one end (away from the second part 112) of the third part 113 of the antenna extension device 11 may be fixed to the sensing device 14, thereby indirectly fixing the antenna extension device 11 to the door plank 13. In a further embodiment, the first part 111, the second part 112 and the third part 113 may together form a clamp, which holds the inner surface and the outer surface of the door plank 13 by the first part 111 and the third part 113 respectively.

According to the embodiment as described above, a transmitter (not shown) of the sensing device 14 may transmit a radio signal to an indoor receiver (e.g., host or repeater) via the third part 113, the second part 112 and the first part 111 of the antenna extension device 11 in sequence without being blocked and reduced in strength of the radio signal by the door plank 13. Moreover, an indoor transmitter (e.g., host or repeater) may transmit a radio signal to an outdoor receiver (not shown) of the sensing device 14 via the first part 111, the second part 112 and the third part 113 of the antenna extension device 11 in sequence without being blocked and reduced in strength of the radio signal by the door plank 13.

Figure 3:
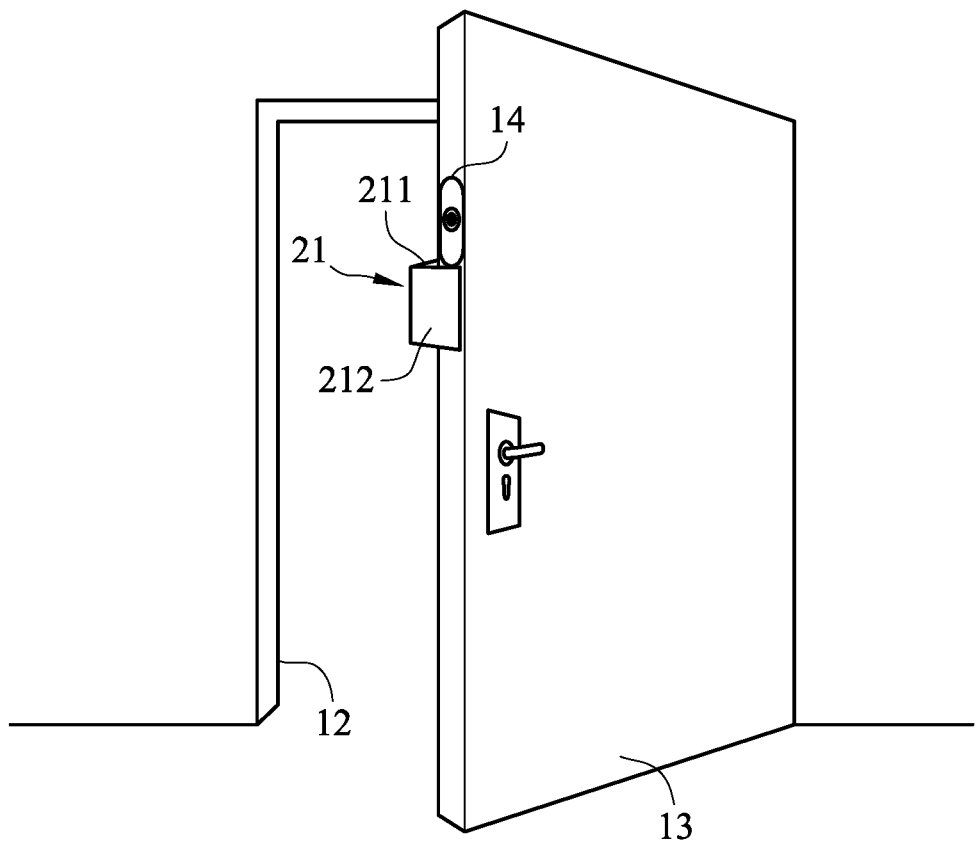
FIG. 3 shows a perspective view illustrating an antenna extension device according to a second embodiment of the present invention.
Figure 4:
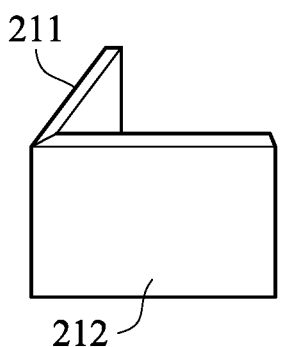
FIG. 4 shows an enlarged perspective view illustrating the antenna extension device of FIG. 3.

FIG. 3 shows a perspective view illustrating an antenna extension device 21 according to a second embodiment of the present invention, and FIG. 4 shows an enlarged perspective view illustrating the antenna extension device 21 of FIG. 3. The antenna extension device 21 of the embodiment may be disposed in space between an opening 12 (or frame) of a wall of a building and a corresponding panel 13. The antenna extension device 21 is configured to facilitate radio wave transfer without being blocked by the panel 13. The doorway 12 and the door plank 13 will be exemplified in the following embodiment. Although one antenna extension device 21 is exemplified, it is appreciated that more than one antenna extension device 21 may be concurrently used instead.

In the embodiment, the antenna extension device 21 having an L-shape cross-sectional profile may include a first part 211 and a second part 212. One end of the second part 212 may be connected to the first part 211, resulting in the L-shape cross-sectional profile. The first part 211 and the second part 212 may be integrally formed, or may be individually formed and then combined. An angle between the first part 211 and the second part 212 may be a substantially right angle or an angle of degrees other than 90. The first part 211 and the second part 212 as exemplified in FIG. 3 and FIG. 4 have rectangular flat surfaces, while they may have other shapes or have curved surfaces.

As exemplified in FIG. 3, the first part 211 of the antenna extension device 21 may be disposed on, and be substantially parallel with, an inner surface of the door plank 13; and the second part 212 may be disposed in (vacant) space between the doorway 12 (or frame) and the door plank 13. Specifically, one end (e.g., top end) of the second part 212 may be directly or indirectly connected to, for example, a feed point of, a sensing device 14 (e.g., sensor). In one embodiment, the sensing device 14 may include a door contact, and may be disposed on a surface of the door plank 13 between the door plank 13 and the doorway 12 for sensing motion between the door plank 13 and the doorway 12.

The first part 211 and the second part 212 of the antenna extension device 21 may include a rigid or flexible structure that is either hollow or solid. The first part 211 and the second part 212 may be made of an electrically non-conductive material, for example, plastics or rubber. The antenna extension device 21 may further include one or more conducting wires, disposed in or on the first part 211 and the second part 212, and one end of each conducting wire may be connected to a feed point of the sensing device 14. In one example, the conducting wires constitute a flat cable disposed in first part 211 and the second part 212. In another example, the first part 211 and the second part 212 constitute a flexible printed circuit board (PCB), on which the conducting wires are disposed.

In one embodiment, the antenna extension device 21 may be fixed to the door plank 13 by conventional technique, for example, by using screws or glue. In another embodiment, (a top end or bottom end of) the second part 212 of the antenna extension device 21 may be fixed to the sensing device 14, thereby indirectly fixing the antenna extension device 21 to the door plank 13.

According to the embodiment as described above, a transmitter (not shown) of the sensing device 14 may transmit a radio signal to an indoor receiver (e.g., host or repeater) via the second part 212 and the first part 211 of the antenna extension device 21 in sequence without being blocked and reduced in strength of the radio signal by the door plank 13. Moreover, an indoor transmitter (e.g., host or repeater) may transmit a radio signal to a receiver (not shown) of the sensing device 14 via the first part 211 and the second part 212 of the antenna extension device 21 in sequence without being blocked and reduced in strength of the radio signal by the door plank 13.

Although specific embodiments have been illustrated and described, it will be appreciated by those skilled in the art that various modifications may be made without departing from the scope of the present invention, which is intended to be limited solely by the appended claims.

What is claimed is:

1. An antenna extension device, comprising:
a first part disposed on an inner surface of a panel;
a second part disposed in space between an opening of a building and the panel, the opening correspondingly accommodating the panel; and
a third part disposed on an outer surface of the panel;
wherein two ends of the second part are connected to the first part and the third part respectively to form a U-shape cross-sectional profile, and the third part is connected to a feed point of a sensing device;

wherein the first part, the second part and the third part comprise an electrically non-conductive material with at least one conducting wire disposed therein or thereon.

2. The antenna extension device of claim 1, wherein the first part, the second part and the third part are integrally formed.

3. The antenna extension device of claim 1, wherein an angle between the first part and the second part is a substantially right angle, and an angle between the third part and the second part is a substantially right angle.

4. The antenna extension device of claim 1, wherein the first part is substantially parallel with the inner surface of the panel, and the third part is substantially parallel with the outer surface of the panel.

5. The antenna extension device of claim 1, wherein the sensing device is disposed on the outer surface of the panel.

6. The antenna extension device of claim 1, wherein the sensing device comprises a video door phone (VDP), a passive infrared (PIR) camera or an Internet Protocol (IP) camera.

7. The antenna extension device of claim 1, wherein the opening and the panel are a doorway and a door plank respectively, or are a window opening and a window pane respectively.

8. An antenna extension device, comprising:
a first part disposed on an inner surface of a panel; and
a second part disposed in space between an opening of a building and the panel, the opening correspondingly accommodating the panel;
wherein the second part is connected to the first part to form an L-shape cross-sectional profile, and the second part is connected to a feed point of a sensing device;
wherein the first part and the second part comprise an electrically non-conductive material with at least one conducting wire disposed therein or thereon.

9. The antenna extension device of claim 8, wherein the first part and the second part are integrally formed.

10. The antenna extension device of claim 8, wherein an angle between the first part and the second part is a substantially right angle.

11. The antenna extension device of claim 8, wherein the first part is substantially parallel with the inner surface of the panel.

12. The antenna extension device of claim 8, wherein the sensing device is disposed between the panel and the opening.

13. The antenna extension device of claim 8, wherein the sensing device comprises a door contact.

14. The antenna extension device of claim 8, wherein the opening and the panel are a doorway and a door plank respectively, or are a window opening and a window pane respectively.

* * * * *